3,338,592
STEERING ARRANGEMENT FOR TANDEM AXLES
Willi Hildebrandt, Parkring 7, Emmerich, Germany, and Aloysius Theodorus van Huët, Schoolstr. 11, Pannerden, Netherlands
Filed Jan. 28, 1965, Ser. No. 428,668
Claims priority, application Germany, Feb. 1, 1964,
H 51,550
8 Claims. (Cl. 280—81)

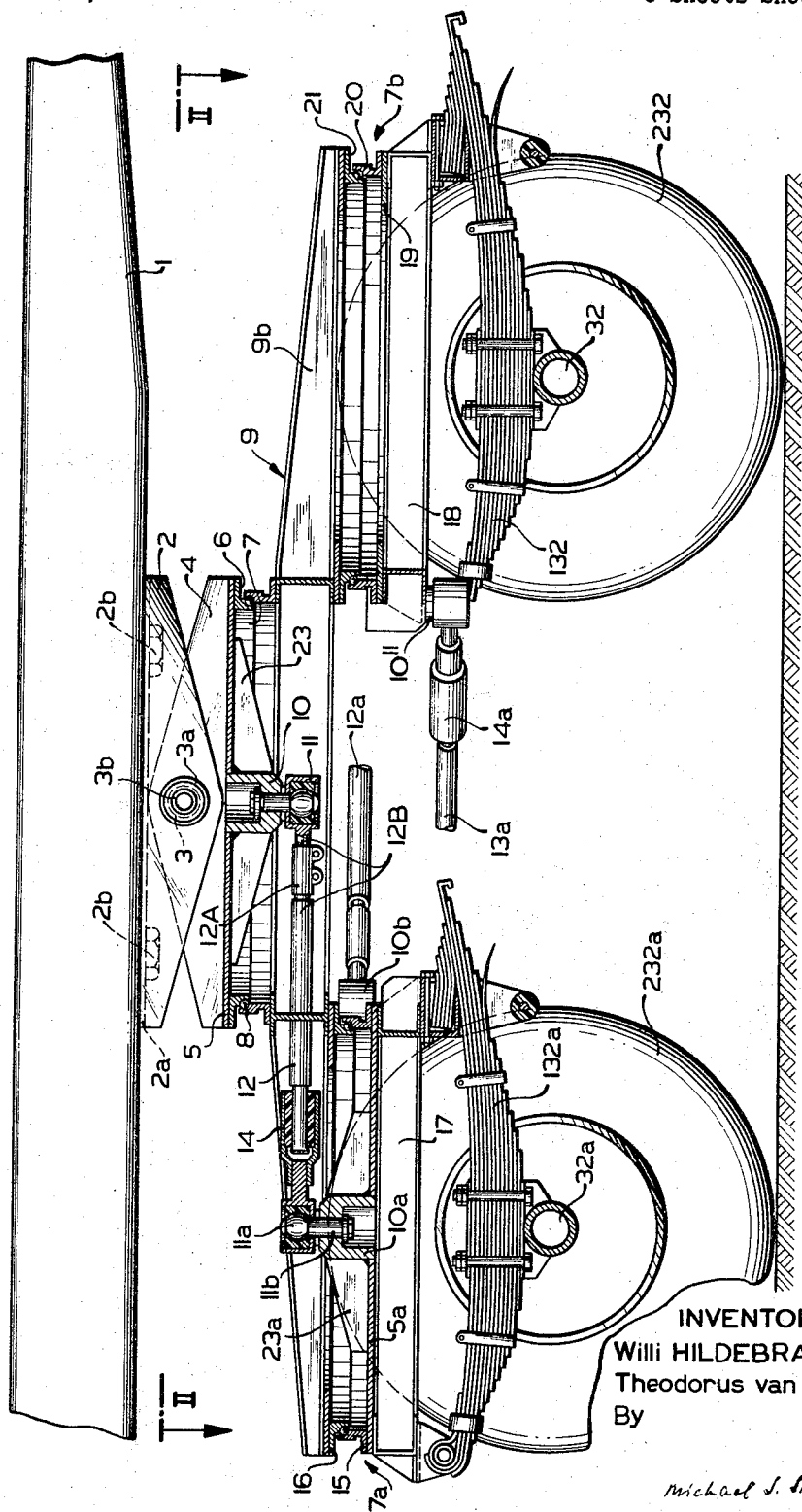

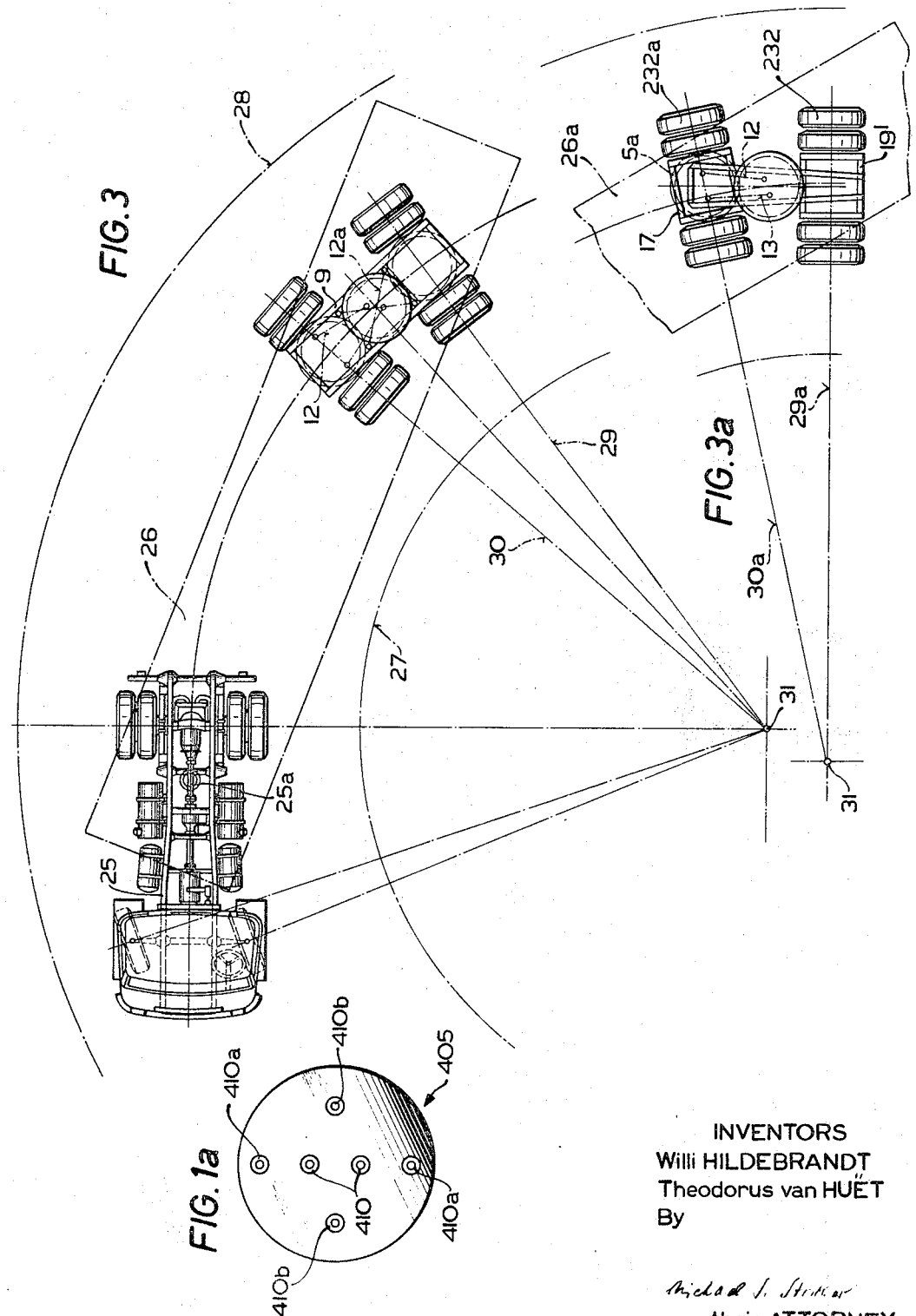

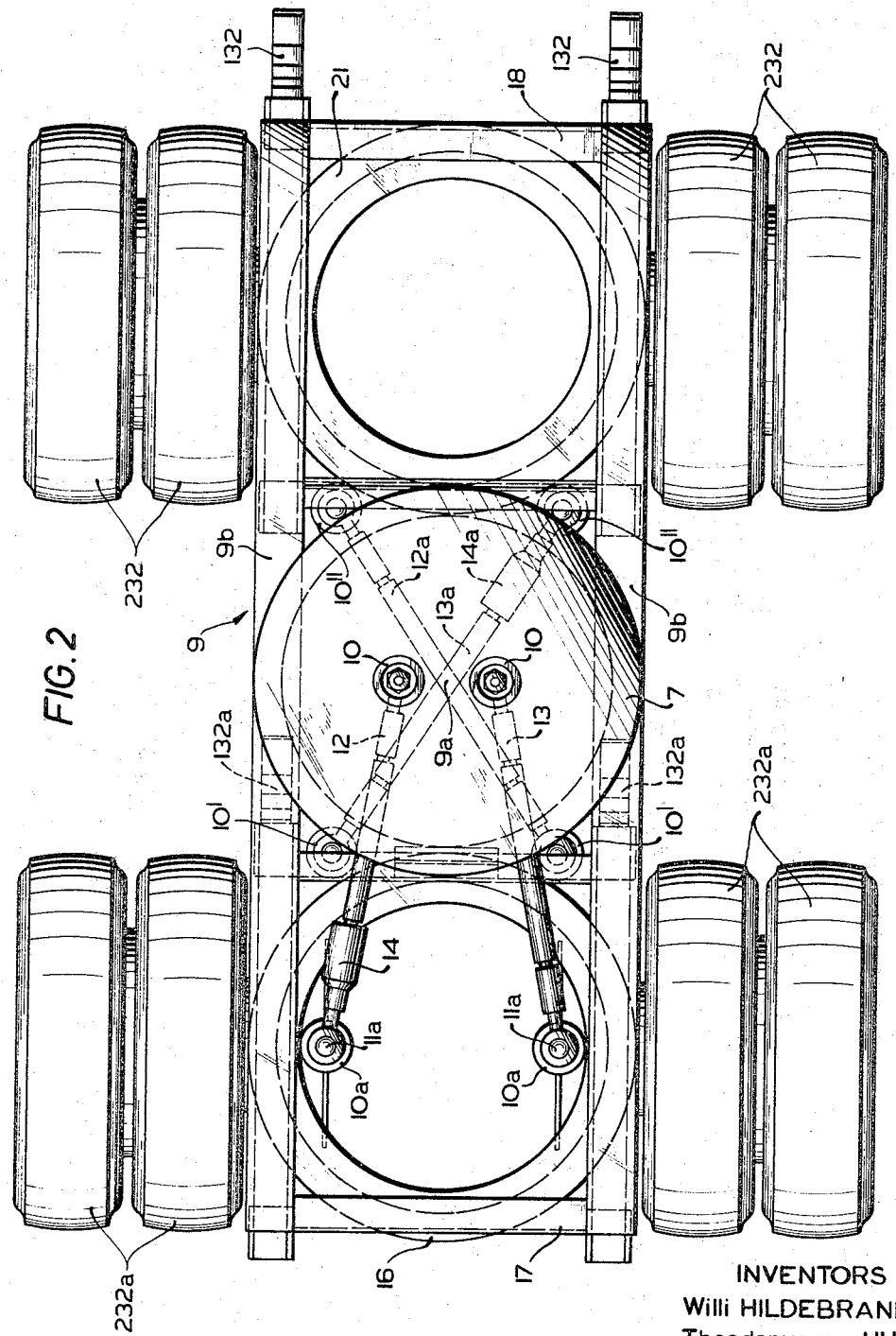

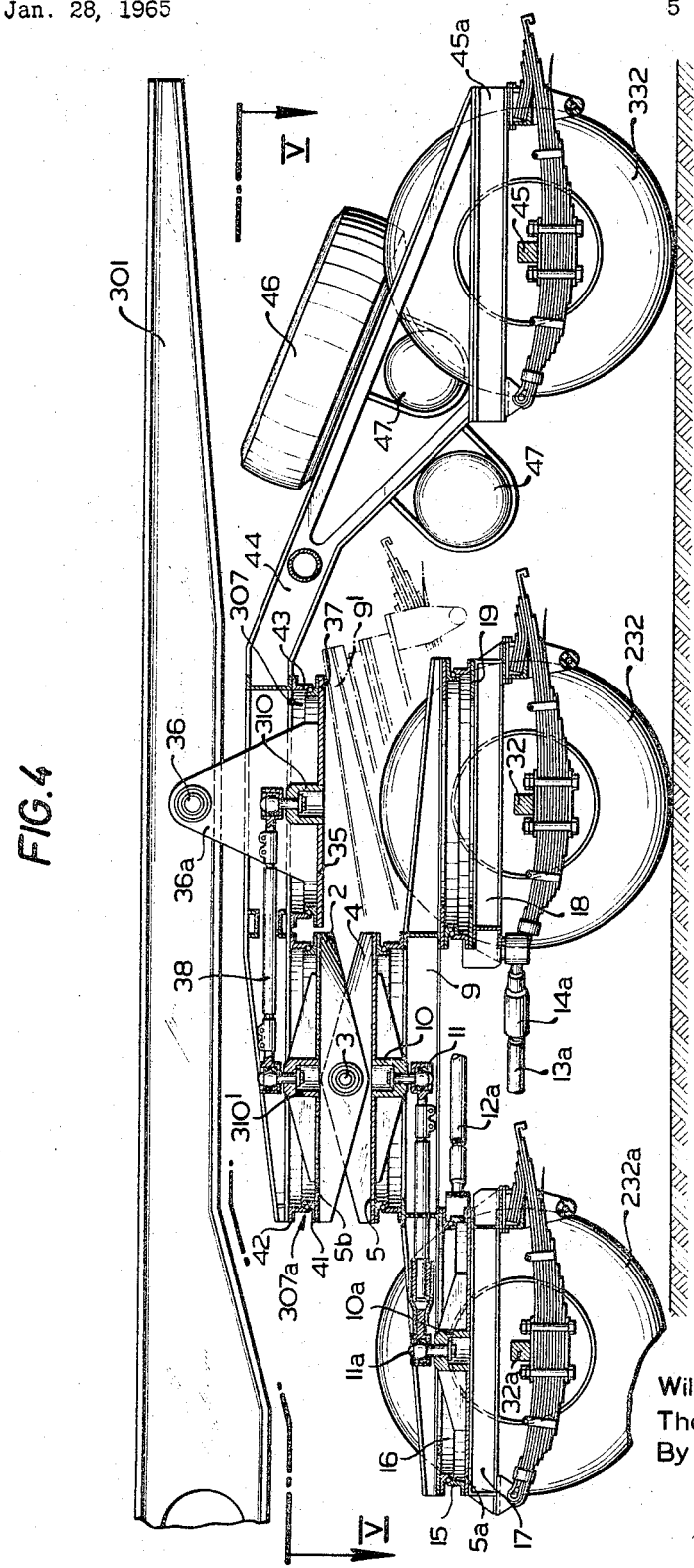

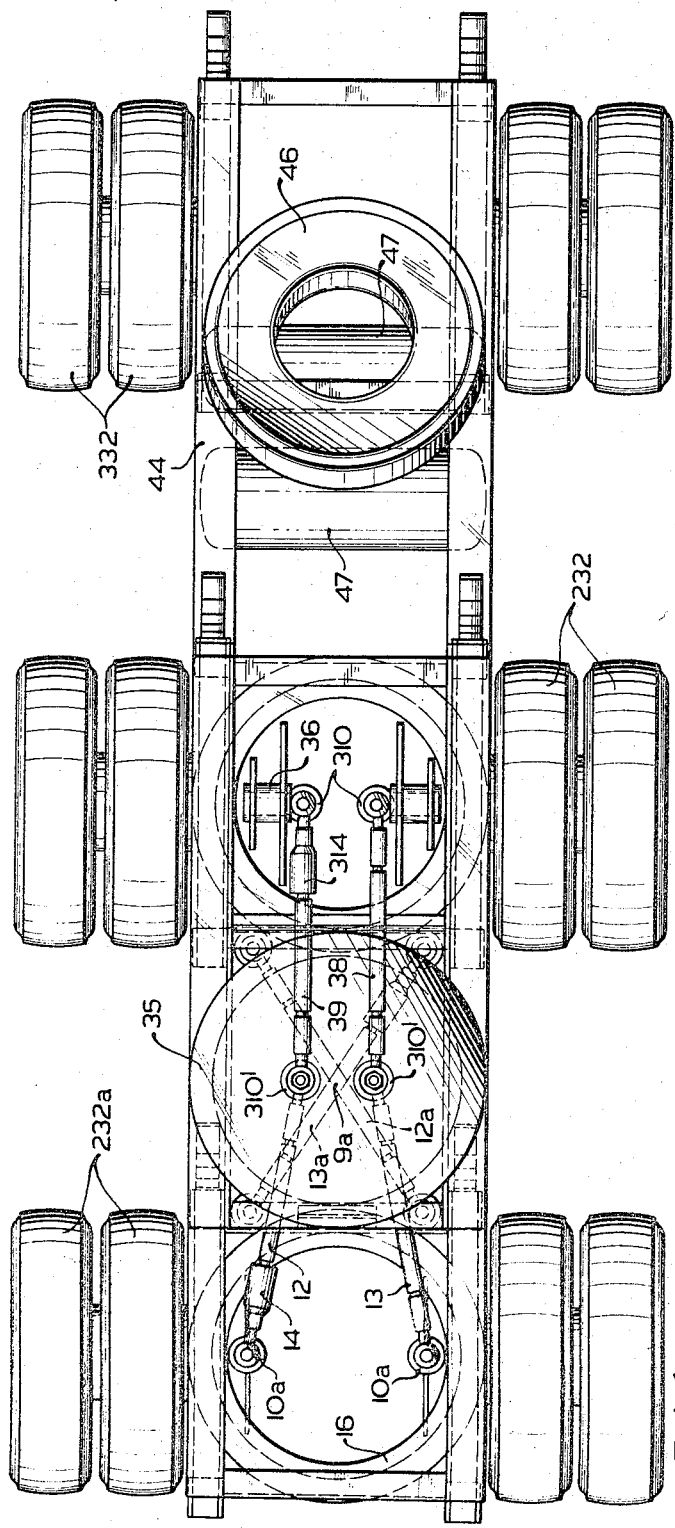
INVENTORS
Willi HILDEBRANDT
Theodorus van HUËT ptent Office 3,338,592
Patented Aug. 29, 1967

The present invention relates to automative vehicles in general, and more particularly to improvements in heavy-duty vehicles which are mounted on tandem axle units, on triple axle units or on units which comprise as many as four or even six or more axles to support one end of a trailer or a similar conveyance. Still more particularly, the invention relates to an improved steering arrangement which may be used in tandem axle units for all types of trailers and for certain other wheel-mounted conveyances. The steering arrangement of our present invention constitutes an improvement over and a further development of the steering arrangement which is disclosed in German Patent No. 1,145,497 of Willi Hildebrandt.

The aforementioned German patent discloses a steering arrangement wherein one of the tandem axles is turned in repsonse to movement of the vehicle in a curve and wherein this one axle receives motion through a planetary transmission or through another system of gears acting upon a crank arm which is coupled to one end of a second arm rigid with the frame of the front axle. The second arm is also coupled to a third arm which is rigid with the frame of the rear axle and which transmits motion in such a way that the front axle turns in a clockwise direction about a first vertical axis when the rear axle turns in a counter-clockwise direction about a second vertical axis, or vice versa.

It is an important object of the present invention to further develop the steering arrangement of this German patent and to construct the steering arrangement in such a way that the wheels on the rear axle of a tandem axle unit (also called aggregate) may travel in the tracks of wheels of the front axle when the vehicle travels in a curve to make sure that such travel in a curve cannot cause any slippage of wheels or shifting of cargo.

Another object of the invention is to provide a steering arrangement of the just outlined characteristics which insures that the tandem axle unit in which the steering arrangement is installed invariably takes a position to reduce the effect of centrifugal force when the vehicle travels in a sharp curve so that the vehicle is compelled to remain in the prescribed lane even if it is driven at relatively high speed.

A further object of the invention is to provide a steering arrangement whose component parts are interchangeable, wherein such component parts require a minimum of maintenance, and wherein the component parts enable the tandem axle unit to move forwardly or rearwardly without affecting the safety of the vehicle in which the unit is installed.

An additional object of the present invention is to provide a tandem axle unit which embodies a steering arrangement of the above outlined characteristics and wherein one of the axles may be replaced by a second tandem axle unit so that the resulting composite unit will include three axles whose wheels invariably travel in a predetermined path whenever the vehicle is driven in a curve.

Still another object of the invention is to provide a trailer or another wheel-mounted conveyance which embodies one or more tandem axle units of the above outlined characteristics and wherein such units may be mounted side-by-side or one behind the other, depending on the dimensions of the vehicle, on desired load and on certain other characteristics.

A concomitant object of the invention is to provide improved bearings, steering elements, control members, frames, rocking units and certain other component parts which may be utilized in a tandem axle unit of the above outlined characteristics.

Still another object of the invention is to provide a tandem axle unit wherein all or at least some of the steering elements are fully protected by less sensitive parts of the unit so that such elements undergo a minimum of wear and are protected not only from impact by rocks but also from dust, moisture and other undesirable influences.

A further object of our invention is to provide a tandem axle unit wherein the component parts of the steering arrangement automatically compensate for wear so that there is no uncontrolled play and that the steering arrangement requires a minimum of lubrication.

Briefly stated, one feature of our invention resides in the provision of a steering arrangement for tandem axle units of trailers and the like. The steering arrangement is embodied in a wheel-mounted conveyance which comprises an elongated main supporting member (for example, the load itself, the platform of a truck or the main frame of a trailer), a rocking unit suspended on the supporting member and defining a transverse horizontal axis, first antifriction bearing means including a first bearing member mounted on the rocking unit for pivotal movement about the transverse axis and a second bearing member which is rotatable with reference to the first bearing member about a first vertical axis, an intermediate frame having a central portion which is rigid with the second bearing member so that the intermediate frame can rotate about the first vertical axis and may also rock about the transverse axis of the rocking unit, second antifriction bearing means including a pair of bearing members one of which is rigid with one end portion (e.g., with the front end portion) of the intermediate frame and the other of which is rotatable with reference to the one bearing member about a second vertical axis, a first axle supporting frame rigid with the other bearing member of the second bearing means, a second axle supporting frame, means for attaching the second frame to the other end portion of the intermediate frame, and motion transmitting or steering means articulately coupling the first bearing member of the first bearing means with the other bearing member of the second bearing means so that the first axle supporting frame is compelled to rotate about the second vertical axis in response to rotation of the main supporting member about the first vertical axis, e.g., when the trailer travels in a curve.

The attaching means for the second axle supporting frame may comprise third bearing means and that member of the third bearing means which is rigid with the second axle supporting frame is then coupled to the other bearing member of the second bearing means in such a way that the second frame turns in a clockwise direction about the vertical axis of the third bearing means when the first frame rotates in a counterclockwise direction about the vertical axis of the second bearing means, or vice versa.

The novel features which are considered as characteristic of the invention are set forth in particular in the appended claims. The improved steering arrangement itself, however, both as to its construction and its mode of operation, together with additional features and advantages thereof, will be best understood upon perusal of the following detailed description of certain specific embodiments with reference to the accompanying drawings, in which:

FIG. 1 is a partly side elevational and partly vertical sectional view of a steering arrangement for tandem axle units of a trailer which is constructed in accordance with a first embodiment of our invention;

FIG. 1a is a diagrammatic plan view of a control member which may be utilized in the arrangement of FIG. 1;

FIG. 2 is a top plan view of the steering arrangement substantially as seen in the direction of arrows from the line II—II of FIG. 1;

FIG. 3 is a top plan view of a towing vehicle which is connected with a trailer embodying the structure shown in FIGS. 1 and 2, the trailer and the towing vehicle being shown during travel in a sharp curve;

FIG. 3a is a fragmentary top plan view of a slightly modified trailer wherein one of the axle supporting frames is rigid with the intermediate frame;

FIG. 4 is a side elevational view of a third steering arrangement for tandem axle units wherein one of the axle supporting frames is replaced by the structure shown in FIGS. 1 and 2; and FIG. 5 is a top plan view of the third steering arrangement substantially as seen in the direction of arrows from the line V—V of FIG. 4.

Referring to the drawings, and first to FIG. 3, there is shown a towing vehicle 25 which is connected to a semitrailer 26 by a fifth wheel 25a of familiar design. The present invention is concerned with the construction, mounting and steering of tandem axles 32, 32a at the rear end of the semitrailer 26. This construction is illustrated in detail in FIGS. 1 and 2.

As shown in FIG. 1, the semitrailer 26 comprises an elongated main supporting member 1 (hereinafter called main frame) whose underside carries bearing brackets 2 connected by a transversely extending horizontal suspension shaft 3. This shaft supports similar brackets 4 which are rigid with a circular disk-shaped motion transmitting plate 5, hereinafter called control member. The parts 2–4 together constitute a rocking unit which enables the control member 5 to rock back and forth about the transverse axis of the suspension shaft 3 but compels it to share all other movements of the main frame 1, i.e., when the semitrailer 26 travels in a curve whose center is located at 31 (see FIG. 3), the control member 5 will be compelled to follow all movements of the main frame 1 which latter must remain in the prescribed lane bounded by an inner circle 27 and an outer circle 28.

The control member 5 is rigid with the upper (inner) bearing member or race 6 of a first (upper) antifriction bearing 7 whose lower (outer) bearing member or race 8 is connected to an intermediate frame 9 and is rotatable therewith about a first vertical axis which is the axis of the bearing 7. This intermediate frame 9 forms part of a truck which includes the tandem axles 32, 32a, their springs 132, 132a, the shoes which connect such springs to the frame 9, and the wheels 232, 232a. The lower race 8 of the bearing 7 is connected to the central portion of the intermediate frame 9. It will be seen that movements transmitted by the main frame 1 through the control member 5 and bearing 7 can result only in angular movement of the intermediate frame 9 about its center point 9a shown in FIG. 2 and located on the vertical axis of the bearing 7.

The underside of the control member 5 is rigid with two downwardly extending female coupling elements or sleeves 10 which may be welded or otherwise integrally secured thereto. These sleeves are reinforced by radially extending ribs 23 which stiffen the control member 5 and form therewith a rigid unit. As shown in FIG. 2, the axes of the sleeves 10 are coplanar with the vertical axis passing through the center point 9a of the intermediate frame 9, and the common vertical plane of such axis is normal to the longitudinal direction of the main frame 1. The axes of the sleeves 10 are equidistant from and are located at the opposite sides of the center point 9a. Each of these sleeves receives a male coupling member here shown as a vertical pin secured to the spherical head 11 of a steering or motion transmitting rod 12, 13 which extends forwardly and whose forward end forms a socket for a similar spherical head 11a mounted on a vertical pin 11b which is rotatably received in a sleeve 10a provided on the turntable 5a of a front frame 17 serving to support the axle 32a and springs 132a. As shown in FIG. 2, the distance between the axes of the sleeves 10a exceeds the distance between the axes of the sleeves 10 so that the steering rods 12, 13 diverge forwardly and form the sides of a regular trapezoid, i.e., the rods 12, 13 are mirror symmetrical with reference to the longitudinal central plane of the frame 1. The rod 12 is provided with a compensating device 14 which may include a tube consisting of rubber or other elastromeric material and serves to permit for some shortening or lengthening of the rod 12 such as might be necessary if the rods 12, 13 are not of identical length. In addition, each of these rods is preferably provided with a length-adjusting device (for example, with a turnbuckle 12A, 12B) which enables the operator to adjust the effective length of the corresponding rod irrespective of automatic adjustments which will take place due to the provision of the compensating device 14. The threads on the parts 12A, 12B of each turnbuckle are left-hand and right-hand threads so that the effective length of the rods 12, 13 may be selected with utmost accuracy and in a very simple way. It will be noted that the sleeves 10a are also provided with stiffening ribs 23 which are integral with the front turntable 5a.

In the embodiment of FIGS. 1 to 3, the steering rods 12, 13 "step down" the angular movement of the control member 5 when the semitrailer 26 travels in a curve. This will be readily understood by considering that the distance between the sleeves 10a exceeds the distance between the sleeves 10. In addition, such mounting of the rods 12, 13 contributes to greater stability of the steering arrangement. The front turntable 5a is rigid with and can be considered to form part of the lower (outer) bearing member or race 15 of a front antifriction bearing 7a which also includes an upper (inner) bearing member or race 16 rigidly fixed to the front end portion of the intermediate frame 9. The turntable 5a is also rigid with the front axle supporting frame 17 so that the rods 12, 13 actually serve to steer the frame 17 and the front wheels 232a. This front frame 17 is rigidly connected with a pair of downwardly extending sleeves 10' which receive spherical heads provided at the front ends of two additional steering rods 12a, 13a. The rod 13a is provided with a compensating device 14a corresponding to the device 14 for the rod 12 and each of these rods is further provided with a length-regulating turnbuckle corresponding to the turnbuckle 12A, 12B. The rear ends of the rods 12a, 13a are connected with spherical heads and pins, corresponding to heads 11a and pins 11b, which are rotatably received in sleeves 10'' provided at the underside of a rear axle supporting frame 18 having at its upper side a turntable 19 which is rigid with and forms part of the lower (outer) bearing member or race 20 of a rear antifriction bearing 7b. This bearing 7b also includes an upper (inner) bearing member or race 21 which is rigid with the rear end portion of the intermediate frame 9. The rear axle supporting frame 18 carries the axle 32, the springs 132 and the wheels 232. It will be noted that the frames 17, 19 are mounted to rotate about the vertical axes of the bearings 7a, 7b.

The steering rods 12a, 13a cross each other in space on a vertical axis which passes through the center point 9a of the intermediate frame 9. Owing to such crossed axes mounting of the rods 12a, 13a, the rear turntable 19 will rotate in a clockwise direction when the front turntable 5a rotates in a counterclockwise direction, or vice versa. It will be noted that the rear turntable 19 resembles an annulus rather than a solid plate; this is due to the fact that this rear turntable need not carry any sleeves, such as the sleeves 10a on the front turntable 5a.

Referring again to FIG. 3, it will be seen that the just described steering arrangement for the front and rear axles 32a, 32 of FIGS. 1 and 2 enables the semitrailer 26 to remain in the prescribed lane between the outer circle 28 and inner circle 27. For example, the radius of the inner circle 27 is about 6.5 m., and the radius of the outer circle 28 is about 12 m. The main frame 1 shares all movements of the semitrailer 26, and all movements of the main frame 1 around the center of curvature 31 are shared by the control member 5 because the shaft 3 allows this control member to rock only about a horizontal axis which is normal to the longitudinal extension of the main frame. Such angular movements of the control member 5 about the center of curvature 31 cause the steering rods 12, 13 and 12a, 13a to change the angular position of the turntables 5a, 19 whereby the front turntable 5a rotates in a counterclockwise direction and the rear turntable 19 rotates in a clockwise direction. The transmission ratio of the steering rods 12, 13 and 12a, 13a is such that the rear wheels 232 travel in the tracks of front wheels 232a because the imaginary extensions 29, 30 of the axles 32, 32a pass through the center of curvature 31. The steering rods are protected by the longitudinally extending profiled members 9b which form part of the intermediate frame 9.

By properly selecting the position of the sleeves 10 and 10a, the manufacturer can determine in advance the exact angular displacement of the front turntable 5a and frame 17 in response to travel of the main frame 1 in a curve. Such angular displacement may exceed or is less than the angular displacement of the frame 1 from its original direction, i.e., from a direction when the trailer travels on a straight portion of the road. In other words, the rods 12, 13 may serve to step down or to step up the angular movement of the control member 5 with reference to the intermediate frame. Angular movements of the control member 5 about the vertical axis of the bearing 7 are identical with angular movements of the main frame 1.

A preferred construction of the control member is shown in FIG. 1a. This modified control member 405 comprises a first pair of sleeves 410 which correspond to the sleeves 10 on the control member 5, a second pair of sleeves 410a whose axes are coplanar with the axes of the sleeves 410 but are more distant from each other, and a third pair of sleeves 410b having axes located in a plane which is normal to the common plane of the axes of the sleeves 410, 410a. The distance between the axes of the sleeves 410b is one-half the distance between the sleeves 410, and if the sleeves 410b are connected with the rear ends of the steering rods 12, 13, the control member 405 must be rotated through 90 degrees with reference to the position shown in FIG. 1a. It will be readily understood that the rate at which the rods 12, 13 transmit angular motion to the front turntable 5a will change if the rear ends of such rods are disconnected from the sleeves 410 and are coupled to the sleeves 410a or 410b.

The control member 5 or 405 may be a steel casting, and its sleeves and ribs may be an integral part thereof. The same applies for the production of turntables 5a and 19. The ribs 23, 23a enable the control member and the front turntable 5a to take up and to transmit substantial torque. It is clear that the ribs 23 and sleeves 10, 410, 410a, 410b may be welded to the control member 5 or 405, and that such control member may be welded to the brackets 4 of the rocking unit.

The manner in which the shoes for the springs 132, 132a are mounted on the axle supporting frames 17, 18 is well known in the art and by itself forms no part of the present invention.

It is to be noted that one of the steering rods 12, 13 or 12a, 13a may be omitted, particularly one of the rods 12a, 13a. Also, the compensating devices 14, 14a may be replaced by devices wherein the elastomeric tube is replaced by a package of dished springs, by one or more helical springs or by other resiliently deformable elements. If one of the rods 12a, 13a is omitted, the other rod can extend in a diagonal plane. The rods 12a, 13a are protected, at least from above, by the frames 9, 17 and 18.

An important function of the intermediate frame 9 and of the rocking unit 2–4 is to insure uniform distribution of stresses to the axles 32, 32a and to the antifriction bearings 7a, 7b. In addition, the rocking unit enables the intermediate frame 9 to follow the outlines of uneven terrain by pivoting about the axis of the shaft 3. The unit 2–4 and the upper bearing 7 together form a simple universal joint which enables the control member 5 to pivot about a horizontal axis and about a vertical axis but compels the control member to follow movements of the main frame 1 when the vehicle travels in a curve. The intermediate frame 9 is compelled to turn about the vertical axis of the bearing 7 when the front turntable 5a turns about the vertical axis of the bearing 7a.

The shaft 3 is mounted in such a way that it can rotate in one direction only which insures that the shaft wears away uniformly when the control member 5 pivots about its axis. This shaft is preferably hollow and its ends are held against axial movement by a pair of stop washers or disks 3a. A bolt 3b extends freely through the interior of the shaft 3 and cooperates with the stop washers 3a to hold the shaft against axial movement. If desired, the shaft 3 or its bolt 3b may be mounted in sleeves (not shown) which consist of elastomeric material and serve as shock absorbers for the main frame 1. Such rocking units require no maintenance (lubrication) and can absorb substantial vibratory or similar stresses.

The upper brackets 2 of the rocking unit are secured to or integral with a platform 2a which is bolted or otherwise fixed to the underside of the main frame 1. The bolts 2b may be removed so that the platform 2a may be affixed to another portion of the frame 1 in order to insure that the tandem axles 32, 32a take a position in which they allow for maximum loading of the semitrailer 26. Once the platform 2a is moved to optimum position, it can be welded or otherwise permanently attached to the main frame 1.

When the semitrailer 26 travels in a curve as shown in FIG. 3, the intermediate frame 9 turns in a direction to move its rear end portion (turntable 19 and axle 32) nearer to the center of curvature 31 to thereby oppose the action of centrifugal force and to keep the rear end of the trailer from skidding outwardly and beyond the outer circle 28. Also, such turning of the intermediate frame 9 keeps the trailer from overturning and prevents buckling of the vehicle 25, 26. In other words, the aforedescribed mounting of the intermediate frame contributes considerably to safety of the semitrailer and to safety of the entire conveyance including the semitrailer and the towing vehicle.

In accordance with a simplification of our invention which is illustrated in FIG. 3a, the rear frame 19' is rigid with the trailing end of the intermediate frame so that the steering rods 12a, 13a may be dispensed with. This means that only the front turntable 5a will rotate when the semitrailer 26a travels in a curve. The rear wheels 232 then travel in paths which do not coincide with but are located inwardly of the paths for the front wheels 232a. The imaginary extension 29a of the axle for the rear wheels 232 still passes through the center of curvature 31 but the rear wheels 232 are slightly offset with reference to the front wheels 232a in a direction toward the center 31. The semitrailer 26a remains in the lane between the inner and outer circles 27, 28. The imaginary extension of the common axis of the front wheels 232a is indicated by a numeral 30a.

FIGS. 4 and 5 illustrate a different trailer having a main frame 301 whose rear end portion is mounted on tandem axles one of which includes a tandem unit corresponding to the one shown in FIGS. 1 and 2 and the other of which includes an axle 45. Actually, the structure of FIGS. 4 and 5 resembles even more the structure shown in FIG. 3a because the axle 45 is more or less rigid with an intermediate frame 44, i.e., there is no turntable for the axle 45 and the axle supporting frame 45a which latter is rigid with the intermediate frame 44.

The main frame 301 carries a transversely extending horizontal suspension shaft 36 which supports a rockable disk-shaped control member 35 through the intermediary of bearing brackets 36a. The control member 35 is rigid with the lower (inner) race 37 of an antifriction bearing 307 whose upper (outer) race 43 is rigid with the intermediate frame 44. Two upwardly extending sleeves 310 are mounted in the same way as the sleeves 10 shown in FIGS. 1 and 2, and these sleeves are attached to spherical heads at the rear ends of two parallel steering rods 38, 39. The front ends of the rods 38, 39 are articulately coupled to sleeves 310′ provided on a second control member 5b which, in a way, corresponds to the main frame 1 of the semitrailer 26 shown in FIGS. 1 to 3. The control member 5b is rigid with the lower (inner) race 41 of an antifriction bearing 307a whose upper (outer) race 42 is rigid with the front end of the intermediate frame 44. The control member 5b is provided with downwardly extending brackets 2 for a horizontal suspension shaft 3, and all parts suspended on the shaft 3 correspond to the parts suspended on the shaft 3 of FIGS. 1 and 2. Therefore, such parts are denoted by numerals which are identical with the numerals used in FIGS. 1 and 2. It will be seen that the steering rod 39 is provided with a compensating device 314 corresponding to the device 14 or 14a of FIGS. 1 and 2.

The intermediate frame 44 serves as a carrier for a spare tire 46 and for one, two or more compressed air tanks 47.

When the frame 301 travels in a curve, the control member 35 shares such angular movement and causes the steering rods 38, 39 to rotate the control member 5b. The rotation of the control member 5b corresponds to that of the control member 35 because the steering rods 38, 39 are parallel to each other. The control member 5b then rotates the control member 5 (whose angular displacement also corresponds to that of the control member 35 and main frame 301) whereby the steering rods 12, 13 and 12a, 13a cause the turntables 5a and 19 to rotate in opposite directions so that the wheels 232 will travel in tracks formed by the wheels 232a. The frame 45a for the rearmost axle 45 moves angularly about the axis of the bearing 307 because it is connected with the upper race 43. This means that the rearmost wheels 332 follow in the tracks of wheels 232.

The shafts 3 and 36 compensate for unevennesses in the road surface by allowing the brackets 36a and 4 to rock about horizontal axes which are normal to the longitudinal direction of the main frame 301. The maximum inclination of the intermediate frame 9 about the axis of the shaft 3 is indicated in FIG. 4 by phantom lines at 9′.

In accordance with a further development of our invention which will be readily understood upon perusal of the description of FIGS. 4 and 5, the improved steering arrangement may be utilized in heavy-city vehicles with four or six axles. For example, two tandem axle units of FIGS. 1 and 2 may be utilized in a vehicle with four rear axles, and two triple axle units of FIGS. 4 and 5 may be used in a vehicle with six rear axles. Thus, and referring to FIGS. 4 and 5, a third suspension shaft may be used to combine the illustrated triple axle unit with a second triple axle unit and the two units are then coupled to each other by an additional pair of steering rods. It is also possible to place two tandem axle units side-by-side and to provide a pendulum type suspension system for such axle units. The control impulses will be transmitted in the same way as described above, for example, from the frame of a low-bed full trailer, semitrailer or other special trailer on to a control member and thence to one or more intermediate frames.

The improved steering arrangement is not dependent on the length of the vehicle in which it is being put to use. This applies to tandem axle units of the type shown in FIGS. 1 and 2, in FIG. 3a or in FIGS. 4 and 5. In all instances, the angular movement of the uppermost control member depends on angular movement of that portion of the main frame to which the control member is attached by a suspension shaft, and the extent of such angular movement determines the accuracy with which the rear sets of wheels follow the tracks of the foremost sets of wheels in a tandem or triple axle unit. Such accurate tracking of foremost wheels is possible even in the event when the front axle of the tandem unit is very close to the rear axle of the same unit so that, while travelling in a sharp curve, the wheels on the front axle could come in actual rubbing contact with the wheels on the rear axle. By referring to FIGS. 1 and 2, it could happen that the wheels 232a would come in actual contact with the wheels 232 if the semitrailer 26 travels in a sharp curve so that the steering rods 12, 13 and 12a, 13a cause substantial angular displacements of turntables 5a, 19 in opposite directions. This can be prevented by placing one or more freely suspended idler rollers in the space between the wheels 232, 232a at both sides of the control member 5.

It will be noted that steering movements are transmitted by parts which are mounted on antifriction bearings. Therefore, the steering rods are movable in response to minimal impulses and the compensating devices on the steering rods reduce wear because they automatically eliminate unnecessary play. Such compensating devices also reduce the maintenance cost because the corresponding parts move with a minimum of undesirable play so that the spherical heads for the steering rods need not be lubricated at frequent intervals. Furthermore, the devices 14, 14a, 314 eliminate such play which develops in response to prolonged wear on the steering rods and their mounting means. Therefore, oscillatory movements of the vehicle are negligible or nonexistent.

All control members, turntables, bearings, spherical heads, connecting pins, steering rods, sleeves and certain other component parts of the tandem axle units are preferably dimensioned in such a way that they may be used interchangeably. This contributes to reduced maintenance cost because the spare parts can be produced in a money-saving operation. Also, such dimensioning of analogous parts contributes to time-saving mounting of spare parts because many parts may be installed or removed by resorting to the same type of tools.

When the intermediate frame 9 or 44 pivots about the axis of the suspension shaft 3 or 36, the length of the steering rods remains unchanged. Therefore, such control rods undergo some wear only at the time when the vehicle travels in a curve but are not used at all when the vehicle travels in a straight path on a bumpy road.

The rocking unit 2–4 or 36–36a replaces bulky, costly and extremely heavy packages of leaf springs which are used in many types of conventional tandem axle units. The rocking units share angular movements of the main frame when the vehicle travels in a curve and are subjected to lesser stresses than a package of leaf springs.

Finally, it is to be noted that the improved tandem axle units and their steering arrangements allow for reverse travel of the vehicle without causing any blocking of such reverse movement. This is due to the fact that all steered parts are connected to each other, i.e., each part which is steered can move only in response to a predetermined movement of each other steered part. In other words, a vehicle which utilizes the unit of FIGS. 1–2, 3a or 4–5 may be steered with utmost accuracy and with a high degree of safety regardless of whether it moves forwardly or is caused to move in reverse.

Whenever the appended claims refer to vertical axes of the bearings 7–7b and 307–307a, it is meant that such axes are vertical or nearly vertical when the conveyance travels on a horizontal road or terrain.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a wheel-mounted conveyance, in combination, an elongated main frame; a rocking unit including a transversely extending horizontal shaft mounted on said main frame; a first bearing comprising a first bearing member rockably mounted on said shaft and a second bearing member rotatable with reference to said first bearing member about a first vertical axis; a control member rigid with said first bearing member; an intermediate frame rigid with said second bearing member, said intermediate frame having front and rear end portions disposed at the opposite sides of said first bearing; second and third bearings each comprising a first bearing element rigid with one end portion of said intermediate frame and a second bearing element rotatable with reference to the corresponding first element about a vertical axis; an axle supporting frame rigidly attached to each of said second bearing elements; and steering means for said axle supporting frames including a pair of steering members each having a first end portion affixed to said control member and a second end portion affixed to one of said axle supporting frames so as to rotate said one axle supporting frame in response to angular displacement of said control member about said first axis, and at least one additional steering member having end portions operatively connected with said axle supporting frames and arranged to rotate the other axle supporting frame in a clockwise direction when said one axle supporting frame rotates in a counterclockwise direction, and vice versa.

2. In a wheel-mounted conveyance, in combination, an elongated main frame; a rocking unit including a transversely extending horizontal shaft mounted on said main frame; a first bearing comprising a first bearing member rockably mounted on said shaft and a second bearing member rotatable with reference to said first bearing member about a first vertical axis; a control member rigid with said first bearing member; an intermediate frame rigid with said second bearing member, said intermediate frame having front and rear end portions disposed at the opposite sides of said first bearing; second and third bearings each comprising a first bearing element rigid with one end portion of said intermediate frame and a second bearing element rotatable with reference to the corresponding first element about a vertical axis; a turntable rigid with each of said second bearing elements; an axle supporting frame rigidly attached to each of said turntables; and steering means for said axle supporting frames including a pair of steering members each having a first end portion affixed to said control member and a second end portion affixed to one of said turntables to rotate the respective axle supporting frame in response to angular displacement of said control member about said first axis, and at least one additional steering member having end portions operatively connected with said turntables and arranged to rotate the other axle supporting frame in a clockwise direction when said one axle supporting frame rotates in a counterclockwise direction, and vice versa.

3. In a wheel-mounted conveyance, in combination, an elongated main frame; a rocking unit including a transversely extending horizontal shaft mounted on said main frame; a first bearing comprising a first bearing member rockably mounted on said shaft and a second bearing member rotatable with reference to said first bearing member about a first vertical axis; a control member rigid with said first bearing member; an intermediate frame rigid with said second bearing member, said intermediate frame having front and rear end portions disposed at the opposite sides of said first bearing; second and third bearings each comprising a first bearing element rigid with one end portion of said intermediate frame and a second bearing element rotatable with reference to the corresponding first element about a vertical axis; an axle supporting frame rigidly attached to each of said second bearing elements; and steering means for said axle supporting frames including a pair of steering members each having a first end portion affixed to said control member and a second end portion affixed to one of said axle supporting frames so as to rotate said one axle supporting frame in response to angular displacement of said control member about said first axis, and at least one additional steering member having end portions operatively connected with said axle supporting frames and arranged to rotate the other axle supporting frame in a clockwise direction when said one axle supporting frame rotates in a counterclockwise direction, and vice versa, at least two of said steering members being provided with elastic compensating means to allow for some changes in the length thereof.

4. In a wheel-mounted conveyance, in combination, an elongated main supporting member; a rocking unit suspended on said main supporting member and comprising a transversely extending horizontal tubular shaft axially movably mounted on said main supporting member and rotatable about its own axis, and means for holding said shaft against axial movement with reference to said main supporting member including a pair of disks disposed at the ends of said shaft and a bolt extending through said shaft; first antifriction bearing means including a first bearing member rockably mounted on said shaft and a second bearing member rotatable with reference to said first bearing member about a first vertical axis; an intermediate frame having a central portion rigid with said second bearing member, a front end portion, and a rear end portion; second antifriction bearing means comprising a pair of bearing members one of which is rigid with one end portion of said intermediate frame and the other of which is rotatable with reference to said one bearing member about a second vertical axis; a first axle supporting frame rigid with said other bearing member; a second axle supporting frame; attaching means securing said second frame to the other end portion of said intermediate frame; and motion transmitting means articulately coupling said first bearing member with said first frame so that the first frame is compelled to rotate about said second vertical axis in response to travel of said main supporting member in a curve.

5. In a wheel-mounted conveyance, in combination, an elongated main frame; a rocking unit including a transversely extending horizontal shaft mounted on said main frame; a first bearing comprising a first bearing member rockably mounted on said shaft and a second bearing member rotatable with reference to said first bearing member about a first vertical axis; a control member rigid with said first bearing member; an intermediate frame rigid with said second bearing member; said intermediate frame having front and rear end portions disposed at the opposite sides of said first bearing; second and third bearings each comprising a first bearing element rigid with one end portion of said intermediate frame and a second bearing element rotatable with reference to the corresponding first element about a vertical axis, said first, second and third bearings being of identical dimensions so that their parts may be used interchangeably; an axle supporting frame rigidly attached to each of said second bearing elements; and steering means for said axle supporting frames including a pair of steering members each having a first end portion affixed to said control member and a second end portion affixed to one of said axle supporting frames so as to rotate said one axle supporting frame in response to angular displacement of said control member about said first axis, and at least one additional steering member having end portions operatively connected with said axle supporting frames and arranged to rotate the other axle supporting frame in a clockwise direction when said one axle supporting frame rotates in a counterclockwise direction, and vice versa.

6. In a wheel-mounted conveyance, in combination, an elongated main frame; a rocking unit including a transversely extending horizontal shaft mounted on said main frame; a first bearing comprising a first bearing member rockably mounted on said shaft and a second bearing member rotatable with reference to said first bearing member about a first vertical axis; a control member rigid with said first bearing member; an intermediate frame rigid with said second bearing member, said intermediate frame having front and rear end portions disposed at the opposite sides of said first bearing; second and third bearings each comprising a first bearing element rigid with one end portion of said intermediate frame and a second bearing element rotatable with reference to the corresponding first element about a vertical axis; an axle supporting frame rigidly attached to each of said second bearing elements; and steering means for said axle supporting frames including a pair of steering members each having a first end portion affixed to said control member and a second end portion affixed to one of said axle supporting frames so as to rotate said one axle supporting frame in response to angular displacement of said control member about said first axis, and at least one additional steering member having end portions operatively connected with said axle supporting frames and arranged to rotate the other axle supporting frame in a clockwise direction when said one axle supporting frame rotates in a counterclockwise direction or vice versa, said steering members being at least partially concealed and protected by said intermediate frame and said axle supporting frames and being installed entirely within the confines of said frames.

7. In a wheel-mounted conveyance, in combination, a main supporting member; rocking means suspended on said supporting member and defining a transverse horizontal axis; a first bearing including a first bearing member rockable about said axis and a second bearing member rotatable with reference to said first bearing member about a first vertical axis; a first intermediate frame rigid with said second bearing member and having first and second end portions disposed at the opposite sides of said second bearing; a first axle supporting frame rigid with one end portion of said intermediate frame; a second bearing including a first bearing member rigid with the other end portion of said intermediate frame and a second bearing member rotatable with reference to said last named first bearing member about a second vertical axis; a pair of parallel steering rods articulately connected with said second bearing members; second rocking means mounted on the second bearing member of said second bearing and defining a second transverse horizontal axis; a third bearing including a first bearing member rockable about said second horizontal axis and a second bearing member rotatable with reference to said last named first bearing member about a third vertical axis; a second intermediate frame rigid with the second bearing member of said third bearing and having first and second end portions disposed at the opposite sides of said third bearing; a fourth bearing including a first bearing member rigid with one end portion of said second intermediate frame and a second bearing member rotatable with reference to said last named first bearing member about a fourth vertical axis; a pair of mutually inclined steering members articulately connected with the first bearing member of said third bearing and with the second bearing member of said fourth bearing; a second axle supporting frame rigid with the second bearing member of said fourth bearing; and a third axle supporting frame suspended on the other end portion of said second intermediate frame.

8. In a wheel-mounted conveyance, in combination, a main supporting member; rocking means suspended on said supporting member and defining a transverse horizontal axis; a first bearing including a first bearing member rockable about said axis and a second bearing member rotatable with reference to said first bearing member about a first vertical axis; a first intermediate frame rigid with said second bearing member and having first and second end portions disposed at the opposite sides of said second bearing; a first axle supporting frame rigid with one end portion of said intermediate frame; a second bearing including a first bearing member rigid with the other end portion of said intermediate frame and a second bearing member rotatable with reference to said last named first bearing member about a second vertical axis; a pair of parallel steering rods articulately connected with said second bearing members; second rocking means mounted on the second bearing member of said second bearing and defining a second transverse horizontal axis; a third bearing including a first bearing member rockable about said second horizontal axis and a second bearing member rotatable with reference to said last named first bearing member about a third vertical axis; a second intermediate frame rigid with the second bearing member of said third bearing and having first and second end portions disposed at the opposite sides of said third bearing; a fourth bearing including a first bearing member rigid with one end portion of said second intermediate frame and a second bearing member rotatable with reference to said last named first bearing member about a fourth vertical axis; a pair of mutually inclined steering members articulately connected with the first bearing member of said third bearing and with the second bearing member of said fourth bearing; a second axle supporting frame rigid with the second bearing member of said fourth bearing; a fifth bearing including a first bearing member rigid with the other end portion of said second intermediate frame and a second bearing member rotatable with reference to said last named first bearing member about a fifth vertical axis; a third axle supporting frame rigid with the second bearing member of said fifth bearing; and at least one additional steering member connecting said second and third axle supporting frames to rotate said third axle supporting frame about said fifth vertical axis in a clockwise direction when the second axle supporting frame rotates about said fourth vertical axis in a counterclockwise direction, or vice versa.

References Cited

UNITED STATES PATENTS

| | | | |
|---|---|---|---|
| 471,598 | 3/1892 | Bressler et al. | 280—86 |
| 1,868,912 | 7/1932 | Plank | 280—81 |
| 1,925,712 | 9/1933 | Campbell | 280—99 |
| 1,940,798 | 12/1933 | Hanna | 280—81.5 |
| 2,562,595 | 7/1951 | Blue | 280—89 X |
| 2,764,424 | 9/1956 | Standing | 280—433 X |
| 2,778,657 | 1/1957 | Chaplin | 280—440 |
| 3,044,795 | 7/1962 | Standing et al. | 280—81 |
| 3,102,735 | 9/1963 | Biggs | 280—81 |

KENNETH H. BETTS, *Primary Examiner.*